United States Patent
Shah et al.

(10) Patent No.: US 10,015,526 B1
(45) Date of Patent: Jul. 3, 2018

(54) METHOD AND APPARATUS FOR ACCESS TO MEDIA CONTENT

(71) Applicant: THE DIRECTV GROUP, INC., El Segundo, CA (US)

(72) Inventors: Premal Shah, Cerritos, CA (US); Apurva Mapara, Chino Hills, CA (US); Patrick Zarrabi, Tarzana, CA (US); Carlos A. Moz, Chino Hills, CA (US); Viral Shah, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/446,424

(22) Filed: Mar. 1, 2017

(51) Int. Cl.
| | |
|---|---|
| *H04N 7/16* | (2011.01) |
| *H04N 21/214* | (2011.01) |
| *H04N 21/472* | (2011.01) |
| *H04N 21/441* | (2011.01) |
| *H04N 21/475* | (2011.01) |
| *H04N 21/231* | (2011.01) |

(52) U.S. Cl.
CPC ..... *H04N 21/214* (2013.01); *H04N 21/23113* (2013.01); *H04N 21/441* (2013.01); *H04N 21/4753* (2013.01); *H04N 21/47202* (2013.01)

(58) Field of Classification Search
CPC ........... H04N 21/214; H04N 21/47202; H04N 21/441; H04N 21/4753; H04N 21/23113
See application file for complete search history.

(56) References Cited

U.S. PATENT DOCUMENTS

| | | | |
|---|---|---|---|
| 5,521,631 A | 5/1996 | Budow et al. | |
| 6,684,400 B1 * | 1/2004 | Goode | H04N 7/17318 348/E7.071 |
| 7,689,446 B2 | 3/2010 | Sagar | |
| 8,464,292 B2 | 6/2013 | Xiao et al. | |
| 8,713,612 B2 | 4/2014 | Warrick et al. | |
| 8,776,145 B2 * | 7/2014 | Hyde | H04N 21/4126 725/74 |
| 9,106,940 B2 | 8/2015 | Hayashi et al. | |
| 9,185,434 B2 | 11/2015 | Agnihotri et al. | |
| 2008/0155619 A1 | 6/2008 | Constantinof et al. | |
| 2008/0196056 A1 | 8/2008 | Bassett et al. | |
| 2008/0275974 A1 | 11/2008 | Rackiewicz et al. | |
| 2009/0165053 A1 | 6/2009 | Thyagarajan et al. | |
| 2010/0185470 A1 | 7/2010 | Sagar et al. | |
| 2010/0319014 A1 | 12/2010 | Lockett et al. | |
| 2014/0280587 A1 | 9/2014 | Sharma et al. | |

(Continued)

*Primary Examiner* — Oschta Montoya
(74) *Attorney, Agent, or Firm* — Guntin & Gust, PLC; Matthew Tropper

(57) ABSTRACT

Aspects of the subject disclosure include sending, to a hospitality set-top box, subscription information of a user; receiving from the hospitality set-top box, via a personalized graphical user interface, a request to view a media content item; determining whether access to the media content item is available free of charge as part of a service subscription; selecting, one of a first account or a second account to which a fee for access to the media content item is to be charged; responsive to the first account being selected, charging the fee to the first account; responsive to the second account being selected, charging the fee to the second account; and transmitting the media content item to the hospitality set-top box. Other embodiments are disclosed.

20 Claims, 9 Drawing Sheets

(56) References Cited

U.S. PATENT DOCUMENTS

2014/0282807 A1 9/2014 Joseph et al.
2016/0100199 A1 4/2016 DuBose
2016/0330488 A1 11/2016 Ogle et al.

* cited by examiner

100

200

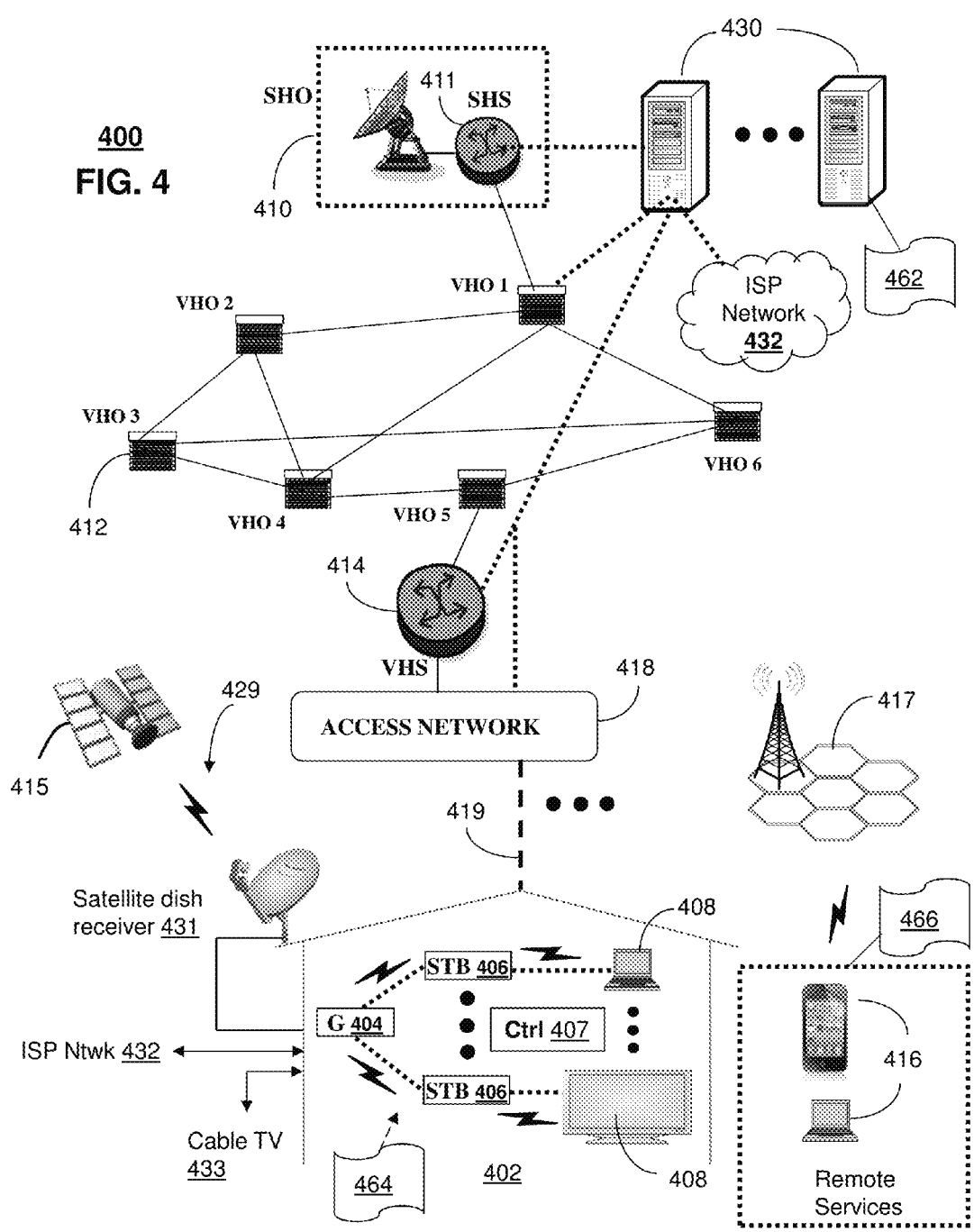

METHOD AND APPARATUS FOR ACCESS TO MEDIA CONTENT

FIELD OF THE DISCLOSURE

The subject disclosure relates to access to media content using a hospitality set-top box in a hotel room or the like.

BACKGROUND

Various systems for customizing hotel media equipment have been provided.

BRIEF DESCRIPTION OF THE DRAWINGS

Reference will now be made to the accompanying drawings, which are not necessarily drawn to scale, and wherein:

FIG. 4 depicts an illustrative embodiment of a communication system that provides media services including distribution of media content to a hospitality set-top box as described in connection with the embodiments of FIGS. 1A, 1B, 2, 3A, 3B and 3C;

DETAILED DESCRIPTION

The subject disclosure describes, among other things, illustrative embodiments for distribution of media content to a hospitality set-top box. In one embodiment, a hospitality set-top box can include a media processing device operating in a non-home location, such as a hotel, which provides media services to a user, such as a guest of the hotel. In another embodiment, a hospitality set-top box can be located at other non-home locations, such as a recreation room, a restaurant, a club, and so forth. Other embodiments are described in the subject disclosure.

One or more aspects of the subject disclosure include mechanisms for providing remote access to content recorded by a home set-top box (sometimes referred to herein as "STB") including a digital video recorder (sometimes referred to herein as "DVR"). In one example, the access is provided by use of a remote set-top box (such as located at a hotel in the user's hotel room).

One or more aspects of the subject disclosure include mechanisms via which the user begins using the hotel STB and is presented with a default graphical user interface (sometimes referred to herein as "GUI"). When the user logs-in with appropriate credentials (e.g., user name and password) the default GUI at the hotel STB changes to the GUI configuration of the user's home STB. All features, functions and content available at the user's home STB are now available at the hotel STB.

One or more aspects of the subject disclosure include mechanisms via which a cloud-based server may intermediate between the home STB and the hotel STB.

One or more aspects of the subject disclosure include mechanisms via which, upon log-in at the hotel STB, a user profile (e.g., containing service subscription information) is obtained (from the home STB and/or the cloud-based server). In one example, the user profile is stored temporarily in memory (e.g., in RAM or ROM) at the hotel STB. In another example, the user profile is deleted from the hotel STB memory when the user checks out of the hotel room. In another example, the user profile is preconfigured on the hotel STB (e.g., when the user registers at the hotel desk or when the user pays for the room on-line).

Figure 1A:
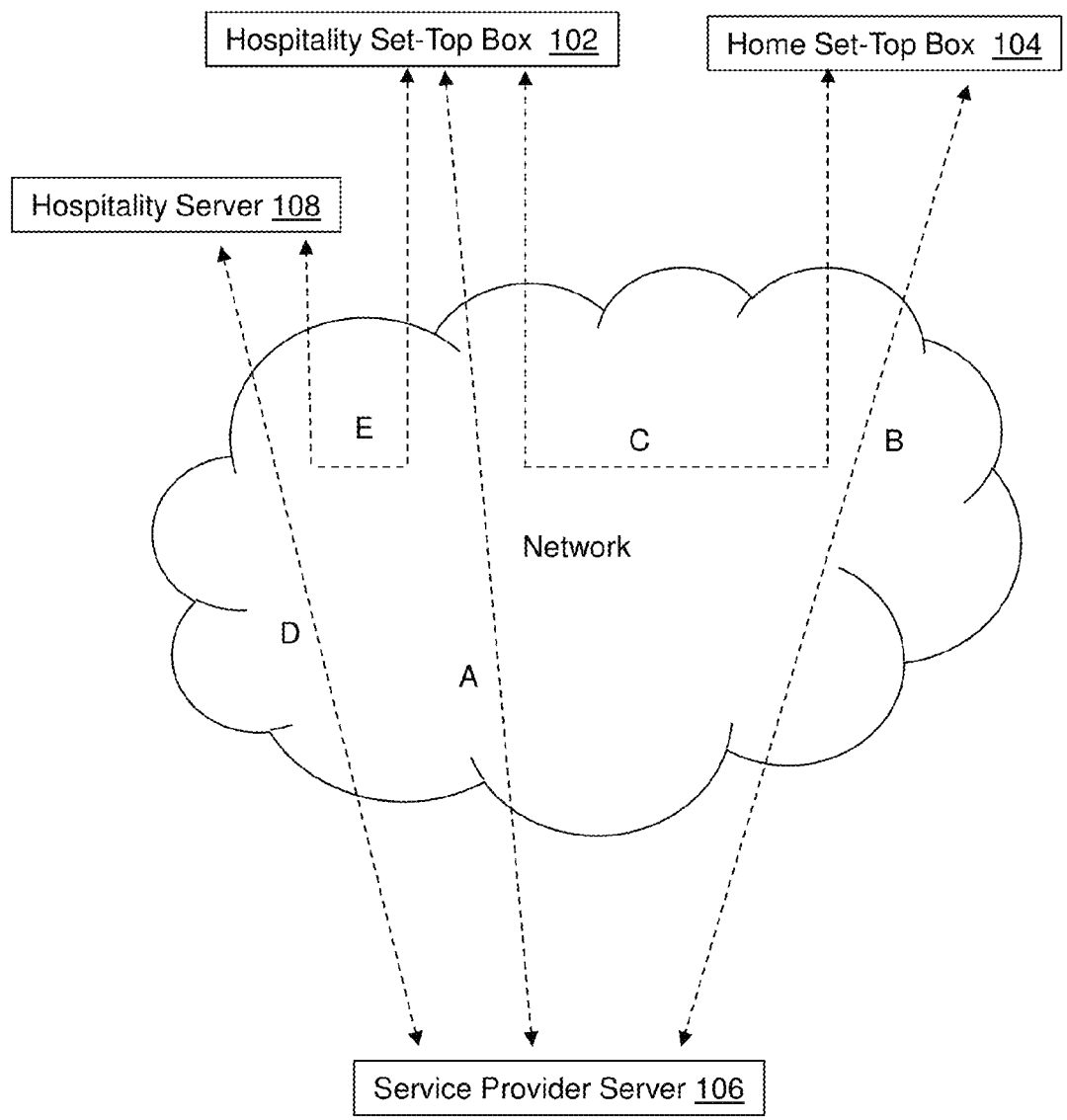
FIG. 1A depicts an illustrative embodiment of a system for providing access to media content at a hospitality set-top box.

FIG. 1A depicts an illustrative embodiment of a system 100 for providing access to media content. As seen in this FIG., a hospitality set-top box 102, a home set-top box 104, a service provider server 106 and a hospitality server 108 are in bi-directional communication via a network (e.g., the Internet). In one example, the hospitality set-top box 102 is in operative communication with an associated hospitality digital video recorder (not shown). In another example, the home set-top box 10 is in operative communication with an associated home digital video recorder (not shown). In one example, the hospitality server is operated by a hotel or the like.

In operation, a user (not shown) logs-in at hospitality set-top box 102. At this point in time, the hospitality set-top box 102 is presenting to the user a default GUI. In one example, the log-in is performed using credentials comprising a user name and a password. The log-in credentials are transmitted (see arrow "A") from the hospitality set-top box 102 to the service provider server 106. In response to the receipt of the log-in credentials, the service provider server 106 transmits back to the hospitality set-top box 102 subscription information (see arrow "A"). In one example, the subscription information is transmitted back to the hospitality set-top box 102 by being included in a user profile that is transmitted back to the hospitality set-top box 102. In one example, the subscription information (such as embodied in a user profile) is transmitted back from the service provider server 106, as mentioned above. In another example, the service provider server 106 sends an instruction (see arrow "B") to the user's home set-top box 104 to transmit the subscription information (such as embodied in a user profile) and then the home set-top box 104 transmits (responsive to the instruction) the subscription information (such as embodied in a user profile) to the hospitality set-top box 102 (see arrow "C"). In one example, the subscription information (such as embodied in a user profile) is loaded into a memory of the hospitality set-top 102. At this point in time, the hospitality set-top box 102 is presenting (responsive to the received subscription information (such as embodied in a user profile) a personalized GUI. In one example, the personalized GUI is substantially the same as a GUI that is associated with the user's home set-top box 104.

Still referring to FIG. 1A, the user then selects a desired media content item to view (this media content item may be selected via the personalized GUI). In addition, the user selects an account to charge for access to the selected media content item (this account may be selected via the personalized GUI). An identification of the desired media content item and the account to be charged are transmitted (see arrow "A") from the hospitality set-top box 102 to the service provider server 106. In response to the receipt of the identification of the desired media content item and the account to be charged, the service provider server 106 transmits back to the hospitality set-top box 102 the desired media content item (see arrow "A"). In one example, the desired media content item is transmitted back from the service provider server 106, as mentioned above. In another example, the service provider server 106 sends an instruction (see arrow "B") to the user's home set-top box 104 to transmit the desired media content item and then the home set-top box 104 to transmits (responsive to the instruction) the desired media content item to the hospitality set-top box 102 (see arrow "C"). In either case, the desired media content item may be transmitted via streaming and/or via download. In one example, the service provider server 106 sends a transmission to hospitality server 108 (see arrow "D") indicating a charge or fee for the media content item sent to hospitality set-top box 102. In another example, hospitality server 108 is configured to control and/or communicate with hospitality set-top box (see arrow "E").

Figure 1B:
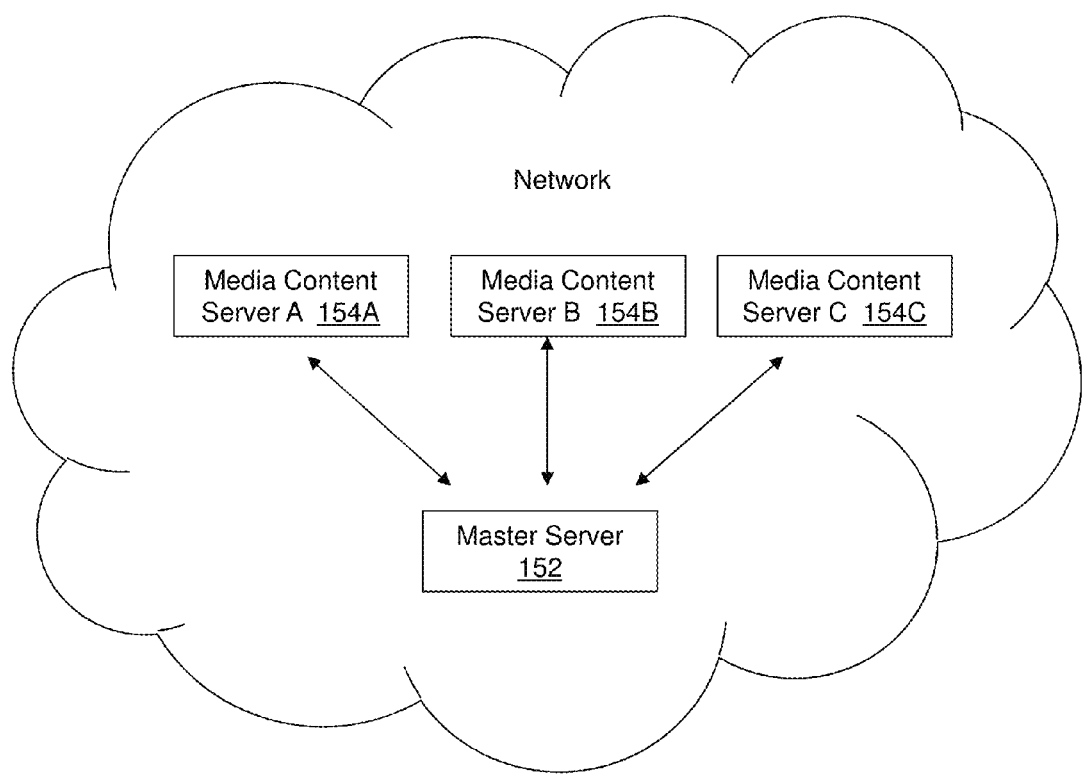
FIG. 1B depicts an illustrative embodiment of a system for providing access to media content at a hospitality set-top box.

FIG. 1B depicts an illustrative embodiment of a system 150 for providing access to media content. As seen in this FIG., master server 152 is in bidirectional communication (through the network) with media content server A 154A, media content server B 154B and media content server C 154C. While three media content servers are shown in this example, any desired number of media content servers may be used. Master server 152 may cause or direct any of media content servers 154A, 154B and 154C to provide media content to a hospitality set-top box (not shown).

Figure 2:
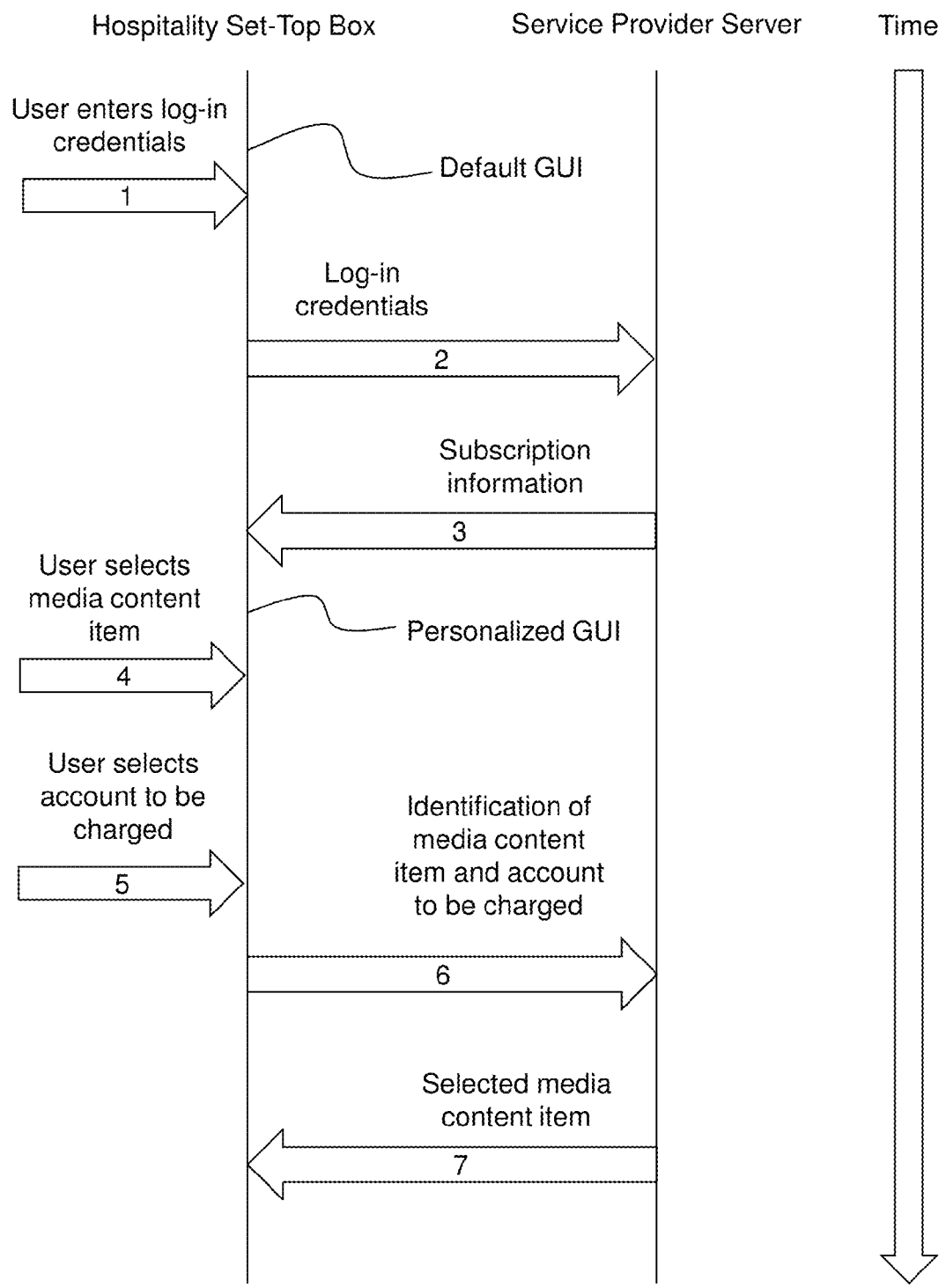
FIG. 2 depicts an illustrative embodiment of a method for providing access to media content at a hospitality set-top box.

FIG. 2 depicts an illustrative embodiment of method for providing access to media content at a hospitality set-top box. As seen in this FIG., a user logs-in at a hospitality set-top box (see arrow "1"). At this point in time, the hospitality set-top box is presenting to the user a default GUI. In one example, the log-in is performed using credentials comprising a user name and a password. The log-in credentials are transmitted (see arrow "2") from the hospitality set-top box to a service provider server. In one example, the service provider server is in bi-directional communication with the hospitality set-top box via a network (e.g., the Internet). In response to the receipt of the log-in credentials, the service provider server transmits back to the hospitality set-top box subscription information (see arrow "3"). In one example, the subscription information is transmitted back to the hospitality set-top box by being included in a user profile that is transmitted back to the hospitality set-top box. In one example, the subscription information (such as embodied in a user profile) is transmitted back from the service provider server, as shown. In another example (not shown) the service provider server sends an instruction to the user's home set-top box to transmit the subscription information (such as embodied in a user profile) and then the home set-top box transmits (responsive to the instruction) the subscription information (such as embodied in a user profile) to the hospitality set-top box. In one example, the subscription information (such as embodied in a user profile) is loaded into a memory of the hospitality set-top box. At this point in time, the hospitality set-top box is presenting (responsive to the received subscription information (such as embodied in a user profile)) a personalized GUI. In one example, the personalized GUI is substantially the same as a GUI that is associated with the user's home set-top box.

Still referring to FIG. 2, the user then selects (see arrow "4") a desired media content item to view (this media content item may be selected via the personalized GUI). In addition, the user selects (see arrow "5") an account to charge for access to the selected media content item (this account may be selected via the personalized GUI). An identification of the desired media content item and the account to be charged are transmitted (see arrow "6") from the hospitality set-top box to the service provider server. In response to the receipt of the identification of the desired media content item and the account to be charged, the service provider server transmits back to the hospitality set-top box the selected media content item (see arrow "7"). In one example, the selected media content item is transmitted back from the service provider server, as shown. In another example (not shown) the service provider server sends an instruction to the user's home set-top box to transmit the selected media content item and then the home set-top box transmits (responsive to the instruction) the selected media content item to the hospitality set-top box. The selected media content item may be transmitted via streaming and/or via download.

Figure 3A:
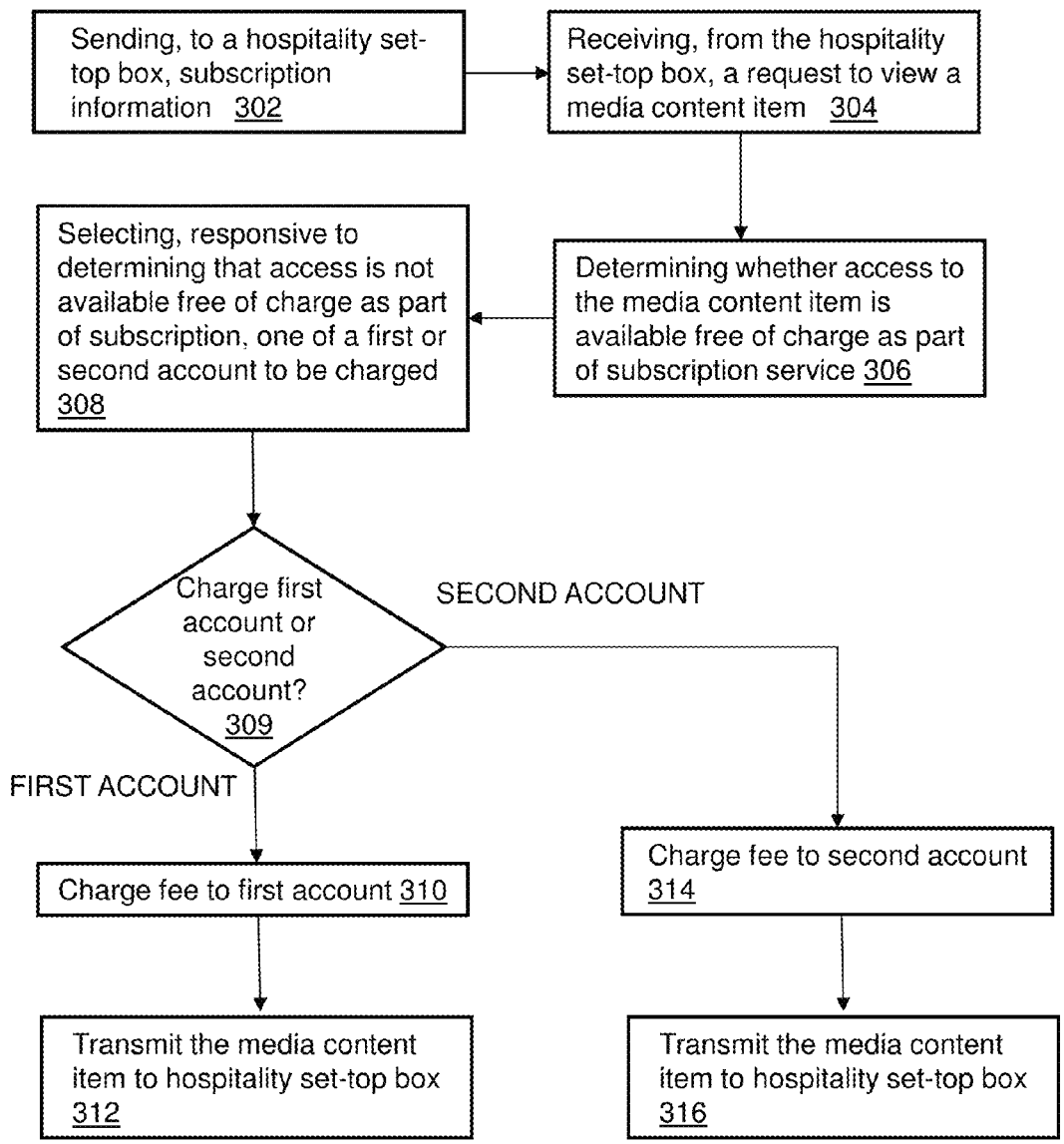
FIG. 3A depicts an illustrative embodiment of a method used in portions of the systems described in FIGS. 1A and 1B.

FIG. 3A depicts an illustrative embodiment of a method used by system 100 of FIG. 1A and/or system 150 of FIG. 1B. While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3A, method 300 begins at step 302 with sending, to a hospitality set-top box, subscription information of a user. In one example, the subscription information comprises an identification of a service subscription of the user with a service provider. In another example, the subscription information is stored temporarily in a memory of the hospitality set-top box. In another example, the subscription information enables the hospitality set-top box to present a personalized graphical user interface. In another example, the personalized graphical user interface is presented instead of a default graphical user interface. In another example, the personalized graphical user interface is based upon the subscription information. In another example, the hospitality set-top box is in a room of a rental accommodation provided by an accommodation provider.

Still referring to FIG. 3A, method 300 then continues to step 304 with receiving from the hospitality set-top box, via the personalized graphical user interface, a request to view a media content item. In one example, the user initiates a sending of the request to view the media content item. In another example the user initiates a sending of the request by choosing the media content item from a list of media content items (e.g., such as shown in an electronic programming guide of the personalized graphical user interface). Method 300 then continues to step 306 with determining (e.g., responsive to the receiving of the request) whether access to the media content item is available free of charge as part of the service subscription. In one example, the determination may be made based upon subscriber information in a database. Method 300 then continues to step 308 with selecting (e.g., responsive to determining that the access to the media content item is not available free of charge as part of the service subscription) one of a first account to which a fee for access to the media content item is to be charged or a second account to which the fee for access to the media content item is to be charged. In one example, the first account is with the service provider and the second account is with the accommodation provider. In one example, the selecting may be based upon subscriber preferences in a database.

Still referring to FIG. 3A, method 300 then continues to step 309 (shown as a decision box in the flowchart), after which the process continues to either: (a) steps 310 and 312 (in the case that the first account had been selected); or (b) steps 314 and 316 (in the case that the second account had been selected). More particularly, if the first account had been selected, the method then continues to step 310 (charging the fee to the first account) and then to step 312 (transmitting the media content item to the hospitality set-top box). On the other hand, if the second account had been selected, the method then continues (from step 309) to step 314 (charging the fee to the second account) and then to step 316 (transmitting the media content item to the hospitality set-top box).

Figure 3B:
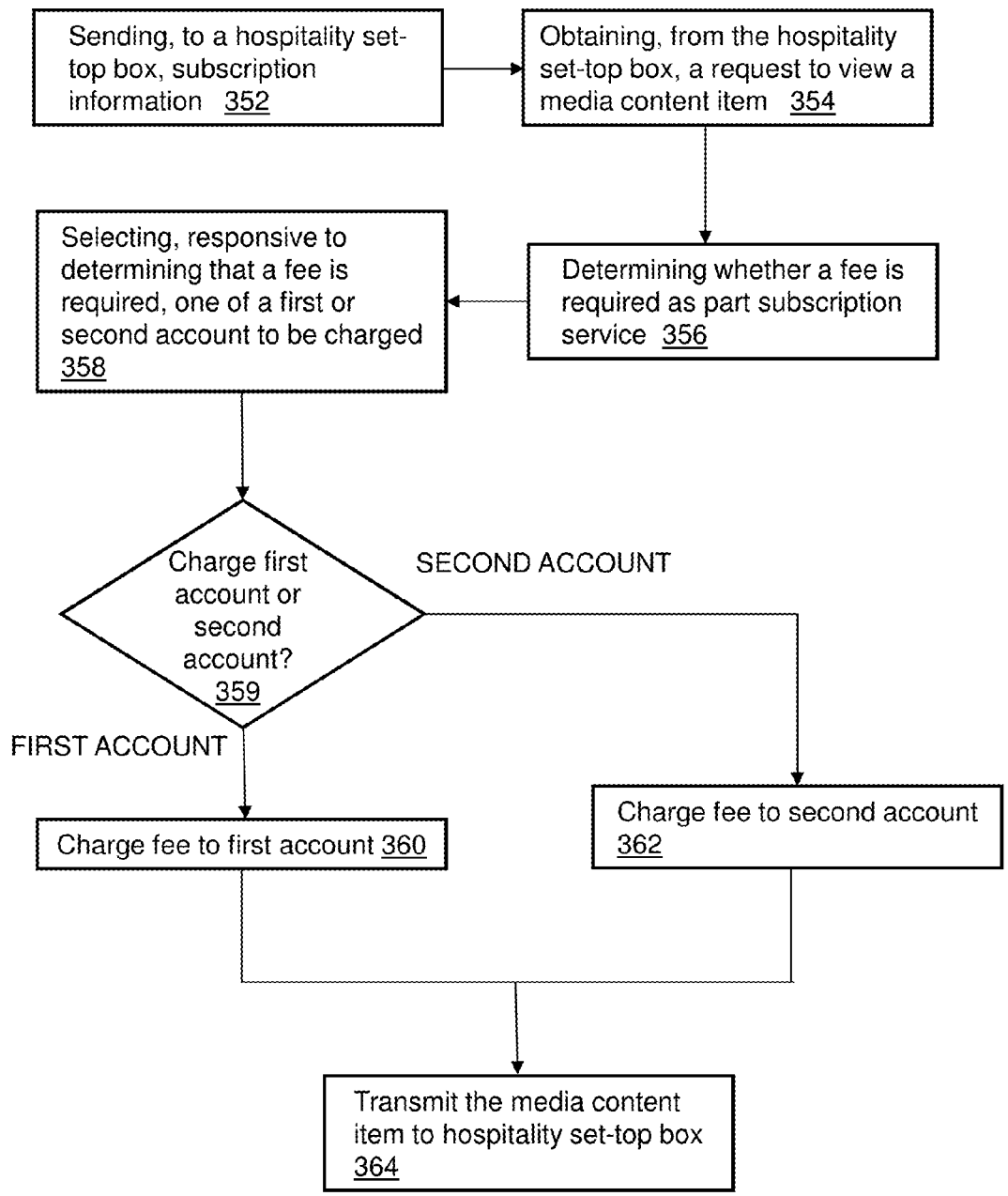
FIG. 3B depicts an illustrative embodiment of a method used in portions of the systems described in FIGS. 1A and 1B.

FIG. 3B depicts an illustrative embodiment of a method used by system 100 of FIG. 1A and/or system 150 of FIG. 1B. While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3B, method 350 begins at step 352 with sending to a hospitality set-top box, in a room of a rental accommodation provided by an accommodation provider, subscription information of a user. In one example, the subscription information comprises an identification of a service subscription of the user with a service provider. In another example, the subscription information is stored temporarily in a memory of the hospitality set-top box. In another example, the subscription information enables the hospitality set-top box to present a personalized graphical user interface. In another example, the personalized graphical user interface is temporarily presented in place of a default graphical user interface. In another example, the personalized graphical user interface is based upon the subscription information. In another example, the personalized graphical user interface is essentially the same interface as a graphical user interface of a home set-top box of the user.

Still referring to FIG. 3B, method 350 continues at step 354 with obtaining a request to view a media content item. In one example, the request to view the media content item is obtained from the hospitality set-top box via the personalized graphical user interface. In one example, the user initiates a sending of a request to view the media content item. In another example the user initiates a sending of a request by choosing the media content item from a list of media content items (e.g., such as shown in an electronic programming guide). Method 350 then continues at step 356 with determining (e.g., responsive to the obtaining of the request) whether a fee is required as part of the service subscription in order for the hospitality set-top box to have access to the media content item. In one example, the determination may be made based upon subscriber information in a database. Method 350 then continues at step 358 with selecting (e.g., responsive to determining that the fee is required) either a first account to which the fee will be charged or a second account to which the fee will be charged. In one example, the first account is with the service provider and the second account is with the accommodation provider. In one example, the selecting may be based upon subscriber preferences in a database.

Still referring to FIG. 3B, method 350 then continues to step 359 (shown as a decision box in the flowchart), after which the process continues to either: (a) steps 360 and 364 (in the case that the first account had been selected); or (b) steps 362 and 364 (in the case that the second account had been selected). More particularly, if the first account had been selected, the method then continues to step 360 (charging the fee to the first account) and then to step 364 (transmitting the media content item to the hospitality set-top box). On the other hand, if the second account had been selected, the method then continues (from step 359) to step 362 (charging the fee to the second account) and then to step 364 (transmitting the media content item to the hospitality set-top box).

Figure 3C:
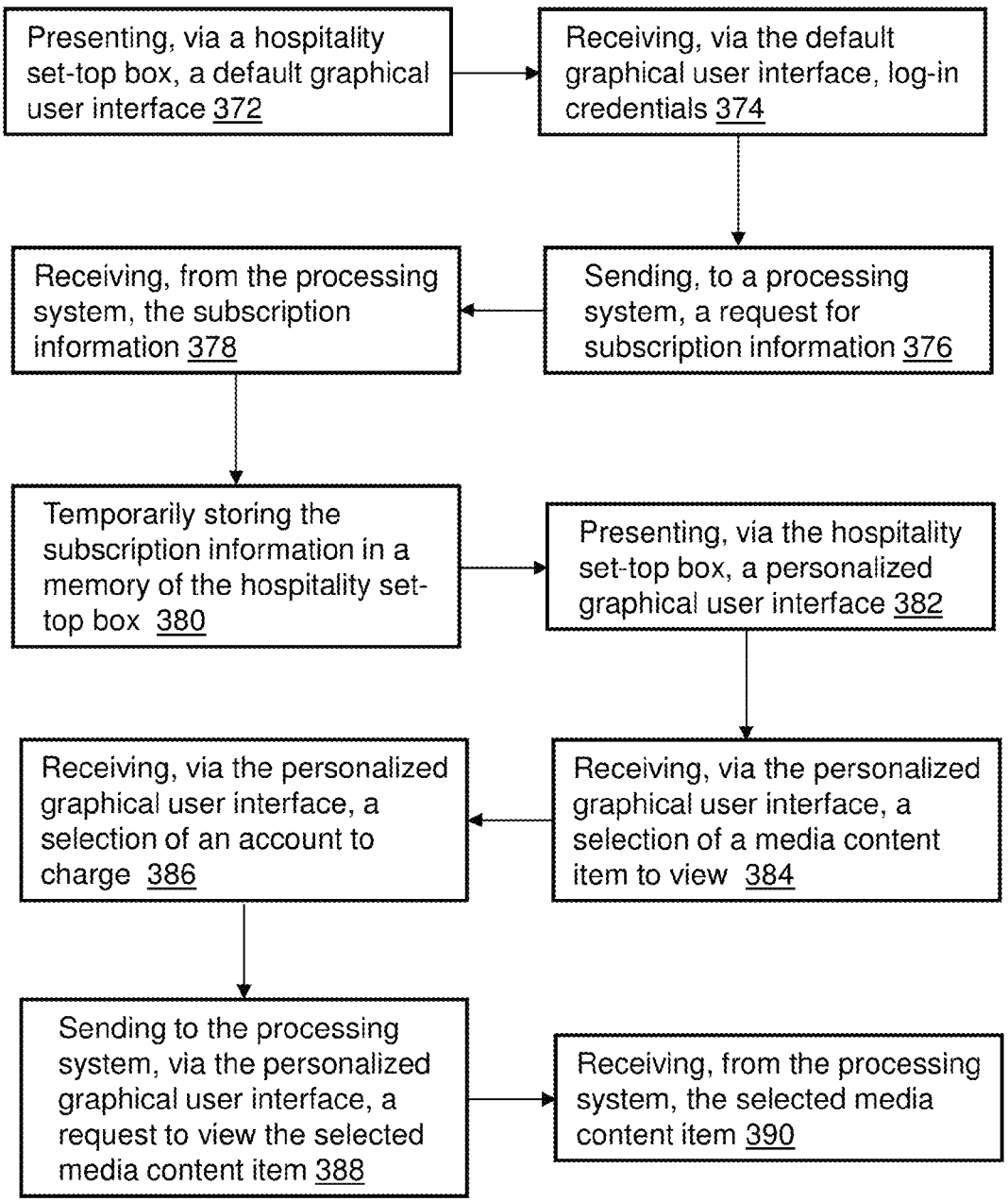
FIG. 3C depicts an illustrative embodiment of a method used in portions of the systems described in FIGS. 1A and 1B.

FIG. 3C depicts an illustrative embodiment of a method used by system 100 of FIG. 1A and/or system 150 of FIG. 1B. While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3C, method 370 begins at step 372 with presenting (e.g., to a user), via a hospitality set-top box, a default graphical user interface. In one example, the hospitality set-top box is in a room of a rental accommodation provided by an accommodation provider. In one specific example, the rental accommodation comprises a hotel room, a hotel suite, a motel room, an apartment, a house, or any combination thereof.

Method 370 then continues to step 374 with receiving (e.g., from the user), via the default graphical user interface, log-in credentials. In one example, the log-in credentials comprise a user name and a password. Method 370 then continues to step 376 with sending to a processing system (e.g., responsive to receiving the log-in credentials) an information request for subscription information. In one example, the information request comprises the log-in credentials. Method 370 then continues to step 378 with receiving from the processing system (e.g., responsive to the information request) subscription information of the user. Method 370 then continues to step 380 with temporarily storing (e.g., responsive to receiving the subscription information) the subscription information in a memory of the hospitality set-top box (wherein the storing results in stored subscription information). In one example, the stored subscription information comprises an identification of a service subscription of the user with a service provider. In another example, the storing may be permanent (rather than temporary).

Method 370 then continues to step 382 with presenting (e.g., responsive to the storing of the subscription information) a personalized graphical user interface (e.g., presenting the personalized graphical user interface to the user). In one example, the personalized graphical user interface is presented instead of the default graphical user interface. In another example, the personalized graphical user interface is based upon the stored subscription information. Method 370 then continues to step 384 with receiving, via the personalized graphical user interface (e.g., from the user), a selection of a media content item to view (resulting in a selected media content item). Method 370 then continues to step 386 with receiving (from the user), via the personalized graphical user interface a selection of one of a first account and a second account to charge for viewing of the selected media content item (resulting in a selected account). In one example, the first account is with the service provider and the second account is with the accommodation provider. Method 370 then continues to step 388 with sending to the processing system, via the personalized graphical user interface, a request to view the selected media content item. In one example, the request to view the selected media content item comprises an identification of the selected media content item and an identification of the selected account as one of the first and second accounts. In one example, the user initiates a sending of the request to view the media content item. In another example, the user initiates a sending of the request by choosing the media content item from a list of media content items (e.g., such as shown in an electronic programming guide of the personalized graphical user interface). In another example, the user initiates a sending of the request by choosing the desired account (e.g., the first account or the second account) from a list of accounts (e.g., such as shown in the personalized graphical user interface). Method 370 then continues to step 390 with receiving from the processing system (e.g., responsive to the request to view the selected media content item) the selected media content item.

As described herein, a service provider may provide various services to a subscriber (e.g., an end user) under a service subscription. In various embodiments, such a service provider (and associated subscription) may be of any desired type (e.g., telecommunication providers (and associated telecommunication subscriptions), access providers (and associated access subscriptions) and/or content providers (and associated content subscriptions)). In one specific example, a telecommunication service provider is a different entity from a content provider (which may provide media content). In another specific example, an access service provider is a different entity from a content provider (which may provide media content).

In one example, the media content item transmitted to the hospitality set-top box was previously recorded (by a home digital video recorder) associated with the user's home set-top box. In another example, the previous recording comprises the home digital video recorder having previously stored the media content item locally at the home digital video recorder or the home digital video recorder having previously received a network address of the media content server where the media content item is located.

In another embodiment, a notice of check-out for the user from the hotel room is sent to the hospitality set-top box. In one example, the notice of check-out is sent to the hospitality set-top box from the hospitality server. In another example, the notice of check-out enables the hospitality set-top box to delete the subscription information from the memory of the hospitality set-top box (wherein, after the hospitality set-top box has deleted the subscription information, the hospitality set-top box is no longer enabled to present the personalized graphical user interface). In another example, after the hospitality set-top box deletes the subscription information from the memory of the hospitality set-top box the hospitality set-top box then once again presents the default graphical user interface.

In another embodiment, the service provider server, responsive to receiving the log-in credentials, performs an authentication process to verify the validity of the log-in credentials. In one example, the authentication process comprises comparing the received log-in credentials to information in a subscriber database. In another example, if the received log-in credentials are not valid, then the service provider server will not send back to the hospitality set-top box the subscription information but will, instead, send back an error message (in which case the hospitality set-top box will be unable to present the personalized graphical user interface (and will be unable to perform the various functions described herein that are associated with the personalized graphical user interface).

As described herein, various embodiments provide for access to playlist content (e.g. home DVR playlist content, media content server playlist content) while travelling. In one example, an authorized subscriber is allowed to log-in to a hospitality set-top box (at, for example, a hotel or resort) to enable access to his or her recorded content (e.g., home DVR recorded content).

As described herein, various embodiments provide mechanisms that can improve customer satisfaction and loyalty (e.g., by giving subscribers access and control over their content from a hospitality set-top box). In one example, the personalized graphical user interface provided at the hospitality set-top box can enable the user to control the home DVR (e.g., set or schedule recordings). In another example, the personalized graphical user interface provided at the hospitality set-top box can enable to user to use "trick-play" functionality (e.g., fast forward, rewind, pause).

In one example, a provider of the services described herein may charge the subscriber a fee for using the services at the hospitality location (e.g., the hotel or resort). In another example, the provider of the services described herein may charge an accommodation provider (e.g. the hotel or resort itself) a fee for allowing the subscriber (e.g., the hotel or resort guest) access to the services at the hospitality location. In another example, the accommodation provider may charge the subscriber (e.g., the hotel or resort guest) a fee for access to the services at the hospitality location. In another example, the accommodation provider may use as a selling point the ability for the subscriber (e.g., the hotel or resort guest) to access the services at the hospitality location.

As described herein, the hospitality STB (that may include a hospitality DVR) may provide a personalized graphical user interface that looks like and provides the functions of the subscriber's home STB (that may include a home DVR). In one example, the hospitality STB/DVR and the subscriber's home STB/DVR may be in operative communication (such as via the Internet).

In one example, the hospitality set-top box may have a default SIM card and a basic profile. The subscription information (e.g., such as may be received from the service provider server in a profile and/or the home set-top box in a profile) may be stored at the hospitality set-top box in the SIM card of the hospitality set-top box (and the profile from service provider server and/or the profile from home set-top box may take priority over the basic profile).

In one example, the service provider server, the master server and/or the media content server may serve content to the hospitality set-top box even if the subscriber's home set-top box is not currently network connected (e.g., not currently connected to the Internet). In another example, the serving of the content by the server(s) to the hospitality set top-box does not affect service at the subscriber's home set-top-box. In another example, there may be a limit to how many hospitality set-top boxes can be served by a given server at a given time (e.g., a limit to how many hospitality set-top boxes can be served content for a particular subscriber account at a given time).

In another example, there may be a one-to-one correspondence between the number of accommodation rooms (e.g., hotel rooms) and the number of hospitality set-top boxes (e.g., 200 hotel rooms and 200 hospitality set-top boxes—one hospitality set-top box in each hotel room).

In another example, an Internet-connected home set-top-box may communicate via a secure connection with a hospitality set-top box (using, for example, customer profiling for the secure connection between the hospitality set-top box and a given subscriber's home set-top box).

In another example, a software implementation allows a subscriber to become authorized by logging-in to his or her profile (e.g., home DVR profile) at a network-connected hospitality set-top box via a secure connection that is created between the subscriber's home STB/DVR server and the hospitality set-top box (thus enabling the subscriber to obtain content at the hospitality set-top box location).

In another example, the network connection between the hospitality set-top box and the home set-top box may be secure. In another example, the network connection between the hospitality set-top box and the service provider server, the master server and/or the media content server may be secure. In another example, the network connection between the home set-top box and the service provider server, the master server and/or the media content server may be secure. In another example, the network connection (e.g., secure network connection) between the hospitality set-top box and the home set-top box may be through the service provider server and/or the master server (that is, the service provider server and/or the master server may act as an intermediary between the hospitality set-top box and the home set-top box).

In another example, a subscriber's subscription information (e.g., embodied in a set-top box profile) may be provided to a hospitality set-top box at check-in to a rental accommodation. The subscription information (e.g., embodied in the set-top box profile) may be provided to the hospitality set-top box from a service provider server, a master server and/or a hospitality server. The subscription information (e.g., embodied in the set-top box profile) may be provided to the hospitality set-top box based upon a credit card used by a guest (e.g., hotel guest) at check-in. In another example, the subscription information (e.g., embodied in the set-top box profile) may become part of the subscriber's profile for a particular rental accommodation (e.g., a particular hotel location). In another example, the subscription information (e.g., embodied in the set-top box profile) may become part of the subscriber's profile for a particular rental accommodation chain (e.g., a particular hotel chain). In either of these latter two cases, the subscription information (e.g., embodied in the set-top box profile) may be stored in a database accessible to a hospitality server.

In another example, a user may reserve a rental accommodation (e.g., a hotel room) on-line (e.g., via a web browser) and the user may provide the log-in credentials at that time (wherein the log-in credentials are later used to provision the hospitality set-top box as discussed herein).

In another example, the set-top box profile of the subscriber's home set-top box may be applied to any desired set-top box(es).

In another example, a subscriber may be billed or required to pay a fee for premium content. The premium content may be paid for in association with a first account (e.g., the hotel room account) or in association with a second account (e.g., a personal month subscription for media services).

In another example, the data sent to the hospitality set-top box that enables the hospitality set-top box to provide a personalized graphical user interface that looks like the graphical user interface of the subscriber's home set-top box can enable a personalized graphical user interface (at the hospitality set-top box) that includes: (a) electronic programming guide (EPG) information (such as favorites) that corresponds to the home set-top box (e.g., the DVR of the home set-top box); (b) the "look and feel" of the home set-top box (e.g., the DVR of the home set-top box); (c) a picture-in-picture feature of the home set-top box (e.g., the DVR of the home set-top box); and/or (d) any other desired feature(s) of the home set-top box (e.g., the DVR of the home set-top box).

In another example, an account to which a fee should be charged (e.g., a fee for viewing and/or listening to premium media content) may be an account of an employer (or other such entity) of the hotel guest. In another example, a business credit card may be linked (or used) to pay a hotel bill (including a fee for premium content). In another example, a business credit card may be linked (or used) to pay a fee for premium content (without being used to pay for the hotel bill). In another example, a personal credit card may be linked (or used) to pay a hotel bill (including a fee for premium content). In another example, a personal credit card may be linked (or used) to pay a fee for premium content (without being used to pay for the hotel bill).

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled to system 100 of FIG. 1A and/or system 150 of FIG. 1B as another representative embodiment of communication system 400. For instance, one or more devices illustrated in the communication system 400 of FIG. 4 can function as the service provider server, the master server and/or the media content server for distributing media content to a hospitality set top box. In another example, one or more devices illustrated in the communication system 400 of FIG. 4 can function as a hospitality set top box for receiving media content (e.g., from a media content server). In another example, one or more devices illustrated in the communication system 400 of FIG. 4 can function as a hospitality server for controlling and/or communicating with the hospitality set top box.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Such a web server can operate as and/or provide the functions of service provider server 106 of FIG. 1A and/or hospitality server 108 of FIG. 1A. Further, such a web server can operate as and/or provide the functions of master server 152 of FIG. 1B and/or one or more of media content servers 154A, 154B and/or 154C of FIG. 1B.

Communication system 400 can also provide for all or a portion of the computing devices 430 to function as a media content server (herein referred to as media content server 430). The media content server 430 can use computing and communication technology to perform function 462, which can include among other things, the media content distribution techniques described by method 200 of FIG. 2, method 300 of FIG. 3A, method 350 of FIG. 3B and/or method 370 of FIG. 3C. For instance, function 462 of server 430 can be similar to the functions described for servers 106, 152, 154A, 154B and/or 154C of FIGS. 1A and 1B in accordance with methods 200, 300, 350 and/or 370. The media processors 406 and wireless communication devices 416 can be provisioned with software functions 464 and 466, respectively, to utilize the services of media content server 430. For instance, functions 464 and 466 of media processors 406 and wireless communication devices 416 can be similar to the functions described for the communication devices 102 and 104 of FIG. 1A in accordance with method 200, method 300, method 350 and/or method 370.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
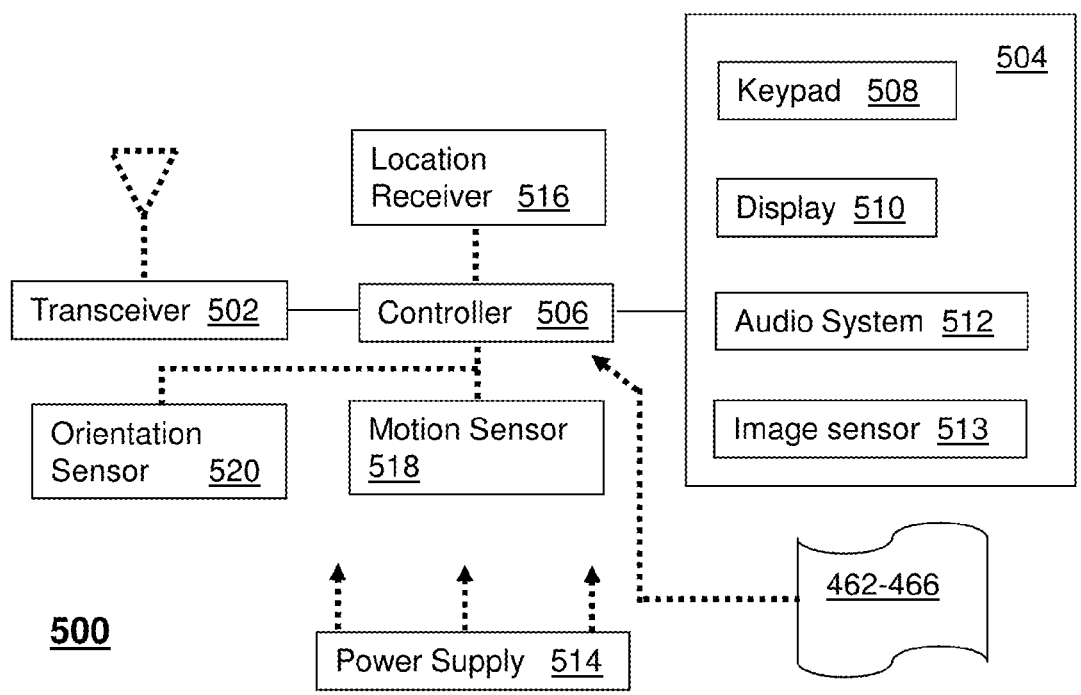
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1A, 1B and/or 4 and can be configured to perform portions of (or all of) method 200 of FIG. 2, method 300 of FIG. 3A, method 350 of FIG. 3B and/or method 370 of FIG. 3C.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500.

In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIGS. 1A and/or 1B, the media processor 406, the media devices 408, or the portable communication devices 416 of FIG. 4. It will be appreciated that the communication device 500 can also represent other devices that can operate in systems of FIGS. 1A, 1B and/or communication system 400 of FIG. 4 such as a gaming console and a media player. In addition, the controller 506 can be adapted in various embodiments to perform the functions 462-466.

Upon reviewing the aforementioned embodiments, it would be evident to an artisan with ordinary skill in the art that said embodiments can be modified, reduced, or enhanced without departing from the scope of the claims described below. For example, any desired number of media content servers may communicate with any desired number of hospitality servers, any desired number of hospitality set-top boxes and/or any desired number of home set-top boxes. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
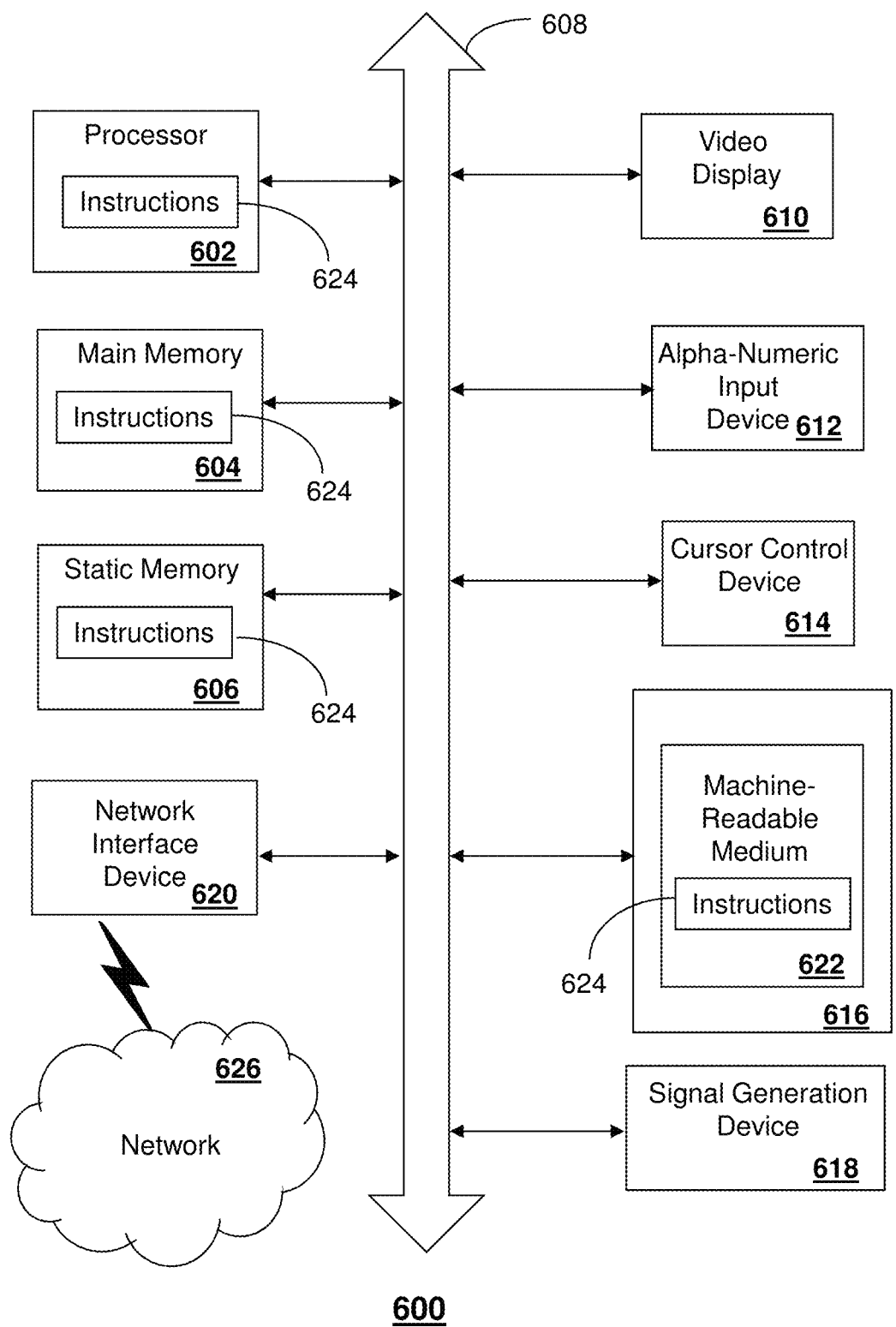
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the media content server 430 and/or the media processor 406. One or more instances of the machine can operate, for example, as the service provider server 106, the hospitality server 108, the hospitality set-top box 102 and/or the home set-top box 104 of FIG. 1A. One or more instances of the machine can operate, for example, as the master server 152, the media content server A 154A, the media content server B 154B and/or the media content server C 154C of FIG. 1B.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

sending by a processing system including a processor, to a hospitality set-top box, subscription information of a user, wherein the subscription information comprises an identification of a service subscription of the user with a service provider, wherein the subscription information is stored temporarily in a memory of the hospitality set-top box, wherein the subscription information enables the hospitality set-top box to present a personalized graphical user interface, wherein the personalized graphical user interface is presented instead of a default graphical user interface, wherein the personalized graphical user interface is based upon the subscription information, and wherein the hospitality set-top box is in a room of a rental accommodation provided by an accommodation provider;

receiving by the processing system from the hospitality set-top box, via the personalized graphical user interface, a request to view a media content item;

determining by the processing system, responsive to the receiving of the request, whether access to the media content item is available free of charge as part of the service subscription;

selecting by the processing system, responsive to determining that the access to the media content item is not available free of charge as part of the service subscription, one of a first account to which a fee for access to the media content item is to be charged or a second account to which the fee for access to the media content item is to be charged, wherein the first account is with the service provider, and wherein the second account is with the accommodation provider;

responsive to the first account being selected:
charging, by the processing system, the fee to the first account; and transmitting, by the processing system, the media content item to the hospitality set-top box; and
responsive to the second account being selected:
charging, by the processing system, the fee to the second account; and
transmitting, by the processing system, the media content item to the hospitality set-top box.

2. The method of claim 1, further comprising:
receiving by the processing system, from the hospitality set-top box, an information request for the subscription information;
wherein the sending by the processing system to the hospitality set-top box the subscription information is responsive to the receiving of the information request.

3. The method of claim 2, wherein the information request comprises log-in credentials of the user.

4. The method of claim 3, wherein the log-in credentials comprise a user name and a password.

5. The method of claim 3, wherein the log-in credentials had been input by the user to the hospitality set-top box via the default graphical user interface.

6. The method of claim 2, wherein the selecting is based upon a selection instruction received from the hospitality set-top box in the information request.

7. The method of claim 1, wherein the rental accommodation comprises a hotel room, a hotel suite, a motel room, an apartment, a house, or any combination thereof.

8. The method of claim 1, wherein the personalized graphical user interface that is enabled by the subscription information comprises an electronic programming guide.

9. The method of claim 1, wherein the processing system is operated by the service provider and wherein the first account is a personal account between the user and the service provider.

10. The method of claim 1, wherein the processing system is operated by the service provider, wherein the second account is a business account between an employer of the user and the accommodation provider, and wherein the charging further comprises sending by the processing system, to an accommodation provider server, an indication of an amount of the fee.

11. The method of claim 1, wherein the selecting is based upon a selection instruction received from the hospitality set-top box in the request to view the media content item.

12. The method of claim 1, wherein the selecting is based upon a selection instruction in a profile stored in a database that is accessible to the processing system, and wherein the profile with the selection instruction had been stored in the database prior to the sending by the processing system the subscription information of the user.

13. A non-transitory machine-readable storage medium comprising executable instructions that, when executed by a processing system including a processor, perform operations, the operations comprising:
sending to a hospitality set-top box, in a room of a rental accommodation provided by an accommodation provider, subscription information of a user, wherein the subscription information comprises an identification of a service subscription of the user with a service provider, wherein the subscription information is stored temporarily in a memory of the hospitality set-top box, wherein the subscription information enables the hospitality set-top box to present a personalized graphical user interface, wherein the personalized graphical user interface is temporarily presented in place of a default graphical user interface, wherein the personalized graphical user interface is based upon the subscription information and wherein the personalized graphical user interface is essentially a same interface as a graphical user interface of a home set-top box of the user;
obtaining a request to view a media content item, the request to view the media content item being obtained from the hospitality set-top box via the personalized graphical user interface;
determining, responsive to the obtaining of the request, whether a fee is required as part of the service subscription in order for the hospitality set-top box to have access to the media content item;
selecting, responsive to determining that the fee is required, either a first account to which the fee will be charged or a second account to which the fee will be charged, the first account being with the service provider and the second account being with the accommodation provider;
responsive to the first account being selected, charging the fee to the first account;
responsive to the second account being selected, charging the fee to the second account; and
responsive to charging the fee to one of the first account and the second account, initiating sending the media content item to the hospitality set-top box.

14. The non-transitory machine-readable storage medium of claim 13, wherein the initiating sending the media content item to the hospitality set-top box comprises sending, by the processing system, the media content item to the hospitality set-top box.

15. The non-transitory machine-readable storage medium of claim 13, wherein the initiating sending the media content item to the hospitality set-top box comprises sending, by the processing system, an instruction to the home set-top box, and wherein the instruction enables the home set-top box to send the media content item to the hospitality set-top box.

16. The non-transitory machine-readable storage medium of claim 13, wherein the initiating sending the media content item to the hospitality set-top box comprises sending, by the processing system, an instruction to a content server operated by a media content service provider, and wherein the instruction enables the content server to send the media content item to the hospitality set-top box.

17. A hospitality set-top box comprising:
a processor; and
a first memory storing instructions that, when executed by the processor perform operations, the operations comprising:
presenting a default graphical user interface, wherein the hospitality set-top box is in a room of a rental accommodation provided by an accommodation provider;
receiving, via the default graphical user interface, log-in credentials, wherein the log-in credentials comprise a user name and a password of a user;
responsive to receiving the log-in credentials, sending to a processing system an information request for subscription information, wherein the information request comprises the log-in credentials;
receiving from the processing system, responsive to the information request, subscription information of the user;
responsive to receiving the subscription information, temporarily storing the subscription information in a second memory of the hospitality set-top box, wherein the storing results in stored subscription information, and wherein the stored subscription information comprises an identification of a service subscription of the user with a service provider;

presenting, responsive to the storing of the subscription information, a personalized graphical user interface, wherein the personalized graphical user interface is presented instead of the default graphical user interface, and wherein the personalized graphical user interface is based upon the stored subscription information;

receiving, via the personalized graphical user interface, a selection of a media content item to view, resulting in a selected media content item;

receiving, via the personalized graphical user interface a selection of one of a first account and a second account to charge for viewing of the selected media content item, resulting in a selected account, wherein the first account is with the service provider, and wherein the second account is with the accommodation provider;

sending to the processing system, via the personalized graphical user interface, a request to view the selected media content item, the request to view the selected media content item comprising an identification of the selected media content item and an identification of the selected account as one of the first and second accounts; and receiving from the processing system, responsive to the request to view the selected media content item, the selected media content item.

18. The hospitality set-top box of claim 17, wherein the operations further comprise presenting the selected media content item that is received.

19. The hospitality set-top box of claim 17, wherein the operations further comprise:
    obtaining a notice of check-out for the user from the room; and
    responsive to obtaining the notice:
        deleting the stored subscription information from the second memory of the hospitality set-top box; and
        no longer presenting the personalized graphical user interface.

20. The hospitality set-top box of claim 19, wherein the notice of check-out is obtained from an accommodation provider server, the accommodation provider server being used for check-in operations and check-out operations associated with the room.

* * * * *